(12) United States Patent
Puetz et al.

(10) Patent No.: US 11,420,364 B2
(45) Date of Patent: Aug. 23, 2022

(54) OPTICAL COMPONENT AND METHOD FOR THE PRODUCTION OF SAME

(71) Applicant: tooz technologies GmbH, Aalen (DE)

(72) Inventors: Joerg Puetz, Aalen (DE); Jens Prochnau, Oberkochen (DE)

(73) Assignee: tooz technologies GmbH, Aalen (DE)

( * ) Notice: Subject to any disclaimer, the term of this patent is extended or adjusted under 35 U.S.C. 154(b) by 685 days.

(21) Appl. No.: 15/763,381

(22) PCT Filed: Sep. 26, 2016

(86) PCT No.: PCT/EP2016/072857
§ 371 (c)(1),
(2) Date: Mar. 26, 2018

(87) PCT Pub. No.: WO2017/055217
PCT Pub. Date: Apr. 6, 2017

(65) Prior Publication Data
US 2019/0105811 A1    Apr. 11, 2019

(30) Foreign Application Priority Data

Sep. 28, 2015  (DE) .......................... 102015116402.7

(51) Int. Cl.
*B29C 39/00*    (2006.01)
*B29C 39/02*    (2006.01)
(Continued)

(52) U.S. Cl.
CPC ............ *B29C 39/021* (2013.01); *B29C 39/10* (2013.01); *B29C 45/0003* (2013.01); *B29C 45/0025* (2013.01); *B29C 2045/0043* (2013.01); *B29L 2011/00* (2013.01); *B29L 2011/0016* (2013.01); *B29L 2011/0075* (2013.01)

(58) Field of Classification Search
CPC .............................. B29C 39/021; B29C 39/10
See application file for complete search history.

(56) References Cited

U.S. PATENT DOCUMENTS 4,775,217 A    10/1988  Ellis
2003/0035214 A1    2/2003  Pandya
(Continued)

FOREIGN PATENT DOCUMENTS

DE    202014100462 U1    3/2014
DE    102013219622 A1    4/2015
(Continued)

OTHER PUBLICATIONS

Office Action to the corresponding Chinese Patent Application No. 201680052574.0 rendered by the Chinese Patent and Trademark Office dated Nov. 27, 2019, 11 pages.
(Continued)

*Primary Examiner* — Nicholas R Krasnow
(74) *Attorney, Agent, or Firm* — Skaar Ulbrich Macari, P.A.

(57) ABSTRACT

An optical component has a small-volume section and a large-volume section, wherein said optical component is a single-piece injection-molded component with the exception of one region in the large-volume section, said component being supplemented, in the region in the large-volume section, by an add-on to the optical component.

10 Claims, 4 Drawing Sheets

(51) Int. Cl.
  *B29C 39/10*  (2006.01)
  *B29C 45/00*  (2006.01)
  *B29L 11/00*  (2006.01)

(56) References Cited

U.S. PATENT DOCUMENTS

| | | | |
|---|---|---|---|
| 2003/0164564 A1* | 9/2003 | Klotz | B29C 45/561 264/2.2 |
| 2004/0208016 A1* | 10/2004 | Kazaoka | F21S 43/247 362/511 |
| 2006/0192306 A1 | 8/2006 | Giller et al. | |
| 2007/0273976 A1 | 11/2007 | Ozygus et al. | |
| 2010/0027121 A1 | 2/2010 | Takahara et al. | |
| 2010/0048855 A1* | 2/2010 | Kato | G02B 1/041 528/201 |
| 2012/0086135 A1* | 4/2012 | Thompson | H01L 23/5389 257/787 |
| 2012/0170280 A1 | 7/2012 | Choquet | |
| 2013/0120707 A1 | 5/2013 | Shan et al. | |
| 2013/0148363 A1 | 6/2013 | Choquet et al. | |
| 2015/0192711 A1 | 7/2015 | Okada et al. | |
| 2015/0340010 A1* | 11/2015 | Travers | G06F 1/163 345/520 |
| 2016/0282621 A1 | 9/2016 | Widulle et al. | |
| 2016/0299344 A1 | 10/2016 | Dobschal et al. | |
| 2016/0306171 A1 | 10/2016 | Rudolph et al. | |
| 2016/0313557 A1 | 10/2016 | Schmidt | |
| 2016/0341903 A1* | 11/2016 | Tang | G02B 6/4246 |

FOREIGN PATENT DOCUMENTS

| | | |
|---|---|---|
| JP | H05-19107 A | 1/1993 |
| WO | 03032066 A1 | 4/2003 |
| WO | 2015044305 A1 | 4/2015 |

OTHER PUBLICATIONS

International Preliminary Report on Patentability rendered by the International Bureau of WIPO for PCT/EP2016/072857, dated Apr. 3, 2018, 7 pages.

The International Search Report and Written Opinion rendered by the International Searching Authority for PCT/EP2016/072857, dated Apr. 6, 2017, 11 pages.

* cited by examiner

OPTICAL COMPONENT AND METHOD FOR THE PRODUCTION OF SAME

PRIORITY

This application claims the benefit of German Patent Application No. 102015116402.7, filed on Sep. 28, 2015, which is hereby incorporated herein by reference in its entirety.

FIELD

The present invention relates to an optical component having a light-guiding region, said optical component, in particular, being able to be an optical component for smartglasses. Additionally, the invention relates to a method for producing such an optical component.

BACKGROUND

Optical components for producing smartglasses, often have portions with very different volumes and different geometries. It is an aim to mass-produce such optical components using injection molding. However, difficulties occur in the process since injection molding does not support, or only supports with very high outlay, large volume differences and very different geometries, as are required for the optical faces and light-guiding region of such optical components.

SUMMARY

An object of the present disclosure is to provide a method for producing an optical component which simplifies, or facilitates for the first time, the application of injection molding when producing the optical component. Additionally, it is a further object to provide an optical component which can be mass-produced using injection molding.

The method for producing an optical component comprising a small-volume portion and a large-volume portion can include in one example:

a) producing a preliminary component by means of injection molding, wherein a region is omitted in the preliminary component in relation to the optical component, said omitted region being situated in that portion of the preliminary component which corresponds to the large-volume portion in the optical component;

b) completing the optical component by complementing the preliminary component with the region that was omitted during injection molding after the injection-molded preliminary component has solidified.

The region in the preliminary component omitted during the injection molding is a recess in that portion of the preliminary component which corresponds to the large-volume portion in the optical component. A filling in the form of a solidifying or curing viscous filler finds use for complementing the preliminary component. Here, the filler may be filled into the recess in the non-solidified or non-cured state and may subsequently solidify or cure. As an alternative to the solidifying or curing viscous filler, a dimensionally stable filling piece may be inserted into the recess for the purposes of complementing the preliminary component. The filling piece may be produced by means of an injection molding process, like the preliminary component. Joining may be effectuated by way of adhesive bonding.

In the case of geometries of the recess which have one or more open sides, the open sides of the recess may be closed by means of a form which serves to delimit the recess to be filled with the filler.

The terms large-volume and small-volume should not reflect the absolute volume of the portions. Instead, in the small-volume portion, the distance from the volume element that is furthest from a surface of the corresponding portion to the closest surface should at most equal half the distance which, in the large-volume portion, the volume element that has the furthest distance from a surface of this portion has from the closest surface. Within this meaning, a small-volume portion may even have a larger absolute volume than a large-volume portion if the small-volume portion has a significantly flatter geometry in comparison with the large-volume portion.

If the completed optical component has a region only guiding light in the large-volume portion (9), the region omitted during the injection molding of the preliminary component may be situated for example where the region only guiding light is present in the completed optical component. Here, a region which is passed by a beam path without there being reflective, refractive or diffractive influencing of the beam path in the volume of the region should be considered to be a region only guiding light. However, reflective, refractive or diffractive influencing of the beam path may be possible at an interface between the injection molding material and the supplementary material.

As a result of a region being omitted in the preliminary component in comparison with the optical component during the injection molding, it is also possible to produce optical components which have regions with very different volumes or very different component geometries—and hence a large-volume region and a small-volume region—using an injection molding process. The differences in the volumes or component geometries are reduced in this case by omitting the region in the preliminary component to be produced by the injection molding process, as a result of which the difficulties occurring during injection molding on account of large-volume differences or strongly different geometries are reduced. In particular, the volumes of the individual regions of the preliminary component can be matched to one another in such a way as a result of the recess that the heat in the injection molding material can be dissipated from the individual regions at largely the same speed during cooling and solidifying such that the formation of hot zones within the injection molding material can be reliably avoided. What becomes possible as a result of this is that the injection molding material solidifies more uniformly in the preliminary component, as a result of which it is possible to largely avoid stresses in the cooled material which may impair the optical properties, and the volume shrinkage becomes more uniform. As a result of the volume shrinkage becoming more uniform, it is likewise possible to reduce the appearance of stresses which are able to impair the optical properties. Overall, this renders it possible to largely avoid the formation of mechanical stresses, which lead to the formation of birefringence, in the injection molded optical component.

It may be advantageous for the material for complementing the preliminary component with the region omitted during the injection molding to have optical properties which correspond to those of the injection molding material. By way of example, the refractive index of the material of the supplement may equal the refractive index of the injection molding material to at least the third decimal place, preferably to at least the fourth decimal place at one wavelength. Additionally, or alternatively, the two materials may be selected in such a way that the Abbe number of the supplement equals the Abbe number of the injection molding material to at least the nearest unit, preferably to the first decimal place. What this renders it possible to achieve is that the transitions between the injection molding material and the material of the supplement influence the optical properties of the optical component only slightly and, in particular, the influencing is reduced to such an extent that the completed optical component is perceived as a component consisting of an optically homogeneous material.

On the other hand, it is also possible to select the optical properties of the material of the supplement in view of the optical properties of the preliminary component in such a way that they minimize optical aberrations of the preliminary component. In this way, it is possible to gain further degrees of freedom when designing the optical component. By way of example, it is possible to accept optical aberrations in the component in order to simplify the injection molding method for producing the preliminary component, said optical aberrations subsequently being compensated by a suitable selection of the supplementary material.

In particular, a tube (occasionally also referred to as prism) for coupling an imaging beam path into a spectacle lens of smartglasses may be produced as an optical component. Such a tube typically comprises a large-volume tube portion and a flat, small-volume tube portion such that the above-described advantages may be realized when producing the tube. However, a construction in which the tube is a "large-volume" part of the spectacle lens itself is also possible.

An optical component in an example embodiment can include a small-volume portion and a large-volume portion, wherein the optical component is an integrally injection molded component apart from a region in the large-volume portion. In the region in the large-volume portion, the integrally injection molded component is completed by means of a supplement to form the optical component. The supplement may be a solidified filler or a pre-manufactured and e.g. adhesively bonded filling piece. The region completed by means of the supplement is a recess in the large-volume portion of the optical component and the supplement is a solidified or cured filler that was filled into the recess or a pre-manufactured dimensionally stable filling piece that was inserted into the recess.

If the optical component has a region only guiding light in the large-volume portion, the recess provided with the supplement is present where the region only guiding light is present.

In particular, the optical component may be embodied as a tube for coupling an imaging beam path into a spectacle lens of smartglasses, which tube may have a large-volume tube portion and a flat, small-volume tube portion. However, the optical component may also be a spectacle lens with a tube, in which the tube is a "large-volume" part of the spectacle lens.

The optical component can be mass-produced by way of the method according to the invention using an injection molding process, wherein the advantages described in respect of the method may be realized. In particular, the formation of form stress, and a birefringence accompanied thereby, and shrinkage may be reduced.

Further features, properties and advantages will become apparent from the following description of an exemplary embodiment with reference to the accompanying figures.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Figure 1:
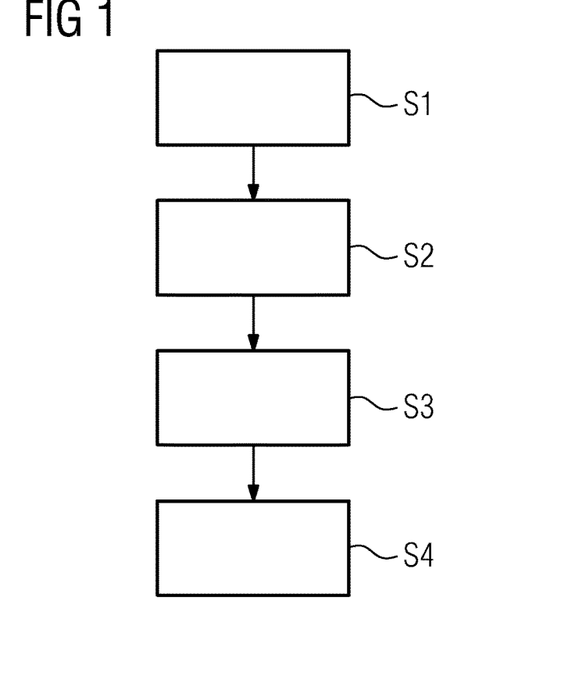
FIG. 1 shows, on the basis of a flowchart, a first exemplary embodiment of the method according to the invention for producing an optical component.

An exemplary embodiment of a method according to the invention for producing an optical component will be described below with reference to FIGS. 1 to 3. Here, FIG. 1 shows the exemplary embodiment in the form of a flowchart and FIGS. 2 and 3 show the optical component various stages of production.

Figure 2:
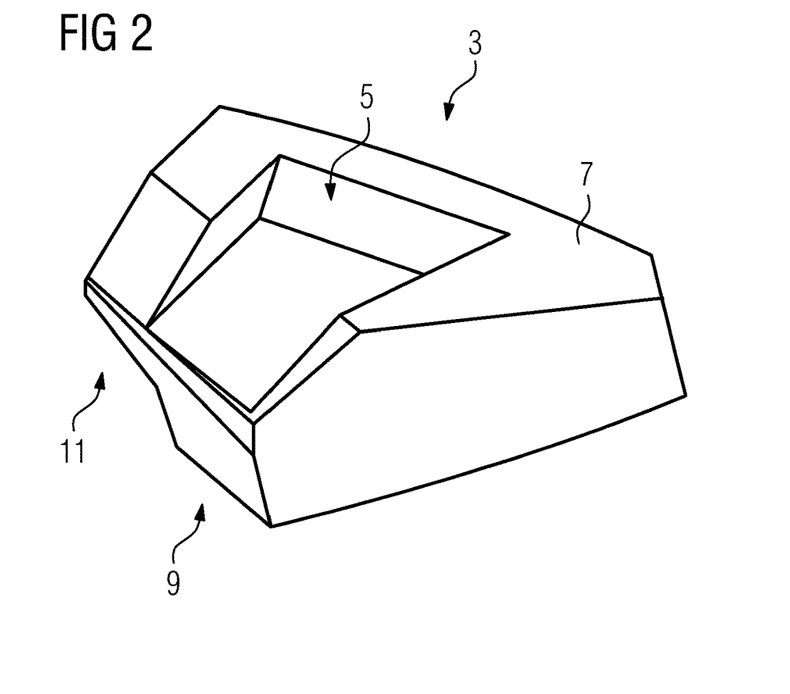
FIG. 2 shows an injection molded preliminary component, the production of which constitutes an intermediate step of the method according to the invention.
Figure 3:
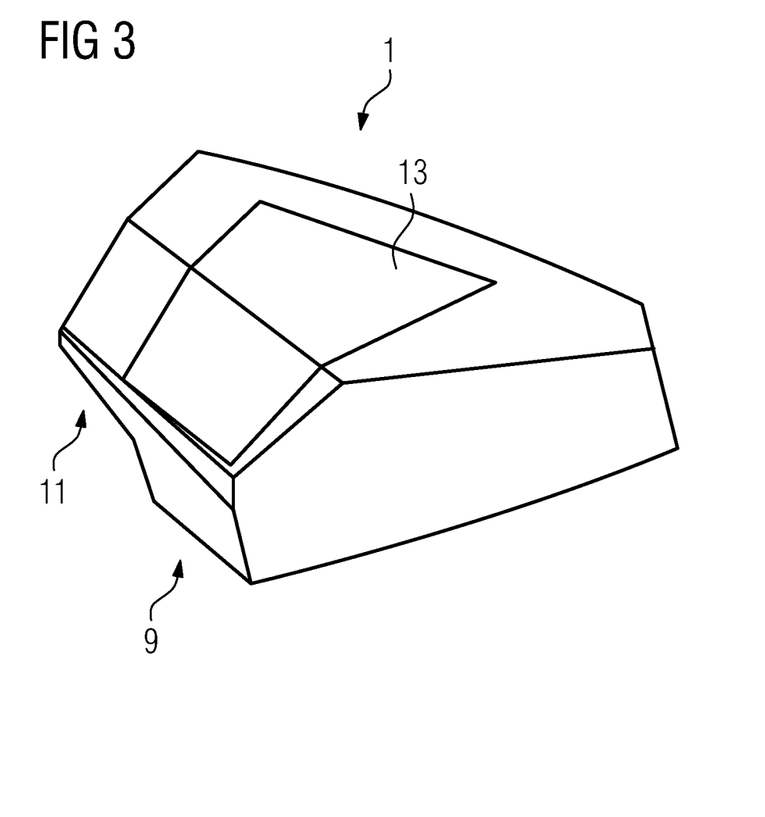
FIG. 3 shows an optical component produced by means of the method according to the invention.

In the exemplary embodiment, illustrated in FIG. 3, of the method according to the invention for producing an optical component 1, a preliminary component, as illustrated in FIG. 2, is produced first in step S1. The production of the preliminary component 3 is effectuated by means of an injection molding method using an injection molding tool, the mold faces of which are embodied in such a way that a recess 5 is formed in a portion of the preliminary component 3. In the region of the recess 5, the preliminary component 3 does not have the final surface 7 of the optical component 1. By contrast, the surface of the preliminary component 3 in the remaining portions corresponds to the final surface 7 of the optical component 1. In the present exemplary embodiment, the injection molding material with which the preliminary component is produced is bisphenol A. However, a different polycarbonate suitable for the injection molding of optical components may also be used.

In the preliminary component 3, the recess 5 is formed in a region 9 of the preliminary component 3 which, in the completed optical component 1, forms a large-volume portion 9 of the component (cf. FIG. 2). Additionally, the completed optical component 1 has a small-volume portion 11, the volume of which in the present exemplary embodiment is only significantly smaller than the volume of the large-volume portion 9 and the geometry of which is embodied to be significantly flatter than the geometry of the large-volume portion 9. More detailed explanations in this respect are provided below.

After the injection molded preliminary component 3 has cooled, the recess 5 is filled with a filler 13 in step S2, said filler in the present exemplary embodiment being a reactive adhesive such as an adhesive with two or more components. Here, the reactive adhesive and the polycarbonate, of which the preliminary component 3 consists, are matched to one another in such a way that the refractive indices thereof equal one another to the fourth decimal place. As a result, it is possible to largely avoid refraction at the transition between the polycarbonate of the preliminary component 3 and the two-component adhesive to such an extent that said refraction influences the optical properties of the component 1 to such a small extent that the envisaged use of the optical component 1 is not impaired. Moreover, the Abbe numbers of the polycarbonate and of the reactive adhesive are matched to one another in the present exemplary embodiment to such an extent that they equal one another to the first decimal place. What can moreover be achieved by adapting the Abbe numbers of the polycarbonate and of the reactive adhesive is that the dispersion of the newly created component does not substantially deviate.

However, the optical properties of the filler 13 may also be used to adjust optical properties of the optical component 1 in a targeted manner. In particular, it is possible here to compensate optical or geometric aberrations of the preliminary component 3 with the aid of the filler 13. This supplies an additional degree of freedom when designing the optical component 1 and provides the option of producing the preliminary component 3 in a way that accepts optical aberrations using a cost-effective and largely uncomplicated method, and compensating the optical aberrations with the aid of the potting compound 13 when filling the recess 5.

After the filler was filled into the recess 5 in step S2, the filler 13 cures in step S3. Thereupon, the optical component 1 may be post-processed in an optional step S4. By way of example, post-processing may comprise the application of a coating onto the surface of the optical component 1. For instance, anti-reflection layers or hard layers may be applied as coatings. Moreover, the post-processing may also contain one or mechanical post-processing steps such as grinding, milling, polishing, etc.

In the optical component 1, the large-volume portion 9 has inner regions which have a greater distance from the surface of the optical component 1 than all inner regions of the small-volume portion 11. An optical component with a geometry like that of the optical component 1 illustrated in FIG. 3 can only be produced with increased technical outlay in an injection molding method. If the optical component 1 were to be produced completely integrally in an injection molding process, internal stresses would arise under certain circumstances when the material cooled, said internal stresses possibly leading to very different shrinkage and to instances of birefringence. A reason for this lies in the fact that the heat from the interior of the small-volume, flat portion 11 can be dissipated more quickly and more homogeneously than from the interior of the large-volume, thicker portion 9. If the optical component 1 were to be produced in an injection molding method, this would have as a consequence that the different cooling rates would lead to a temporally greatly offset solidification of the injection molding material in the interior of the large-volume portion 9 and in the interior of the small-volume portion 11. In turn, mechanical stresses would arise as a consequence, said stresses leading to stress birefringence.

Therefore, it is not the whole optical component 1 that is produced by means of injection molding within the scope of the method according to the invention but instead a preliminary component 3 which constitutes an intermediate step in the production of the optical component 1. On account of the recess 5 situated in the large-volume portion 9, the volume of the large-volume portion 9 in the preliminary component 3 is reduced in relation to the finished optical component 1. Moreover, the geometry in the large-volume portion 9 is modified by the recess 5 in such a way that the distance of inner regions in the large-volume portion from the surface of the large-volume portion 9 is reduced. Therefore, the preliminary component 3 does not have any portions whose volumes and geometries differ from one another to such an extent that strongly different cooling rates arise. As a result, the cooling rates of the large-volume portion 9 and of the small-volume portion 11 are brought closer together such that a largely simultaneous solidification of the entire preliminary component 3 can be achieved. In this way, it is possible to significantly reduce, or even entirely avoid, mechanical stresses in the material. Accompanying this, birefringence and deviations from the geometry are significantly reduced or even entirely avoided.

A second exemplary embodiment of the method according to the invention is described below with reference to FIG. 4, which shows a flowchart representing the second exemplary embodiment. In the second exemplary embodiment, a preliminary component 3, as illustrated in FIG. 2, is produced first by means of an injection molding method in step S10. Here, step S10 corresponds to step S1 of the first exemplary embodiment of the method according to the invention.

Figure 5:
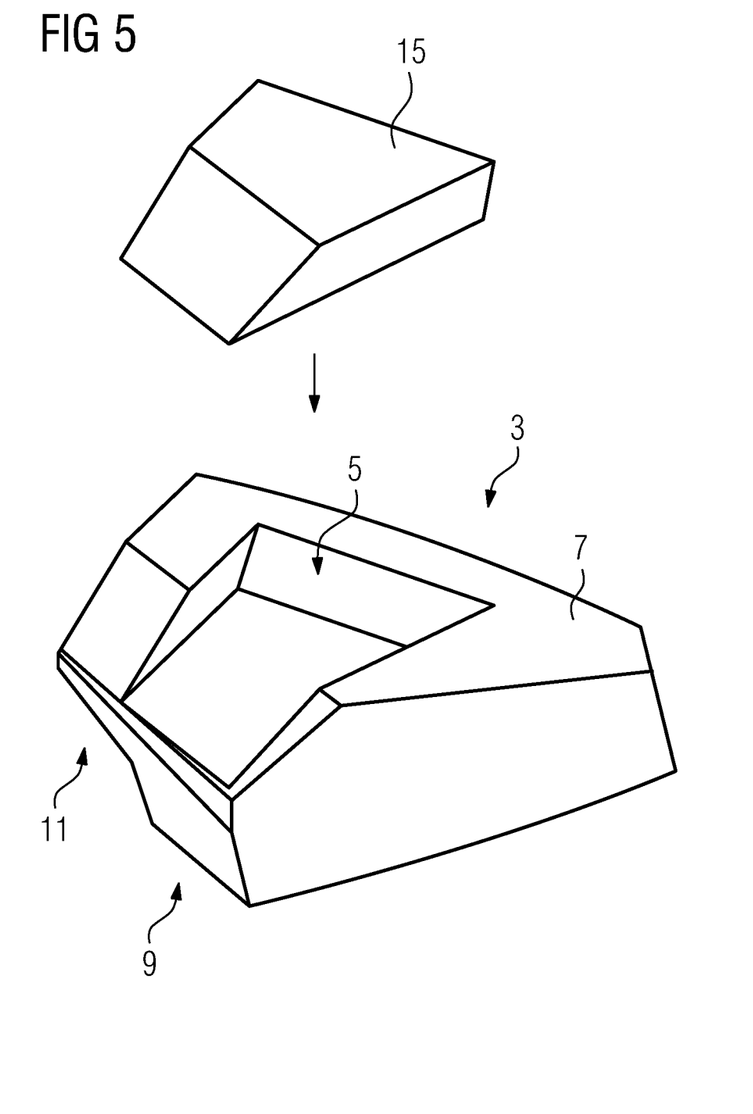
FIG. 5 shows an injection molded preliminary component together with an injection molded filling piece.

In parallel with step S10, a filling piece 15 (see FIG. 5) is produced in step S11 by means of an injection molding process. Here, in the present exemplary embodiment, the injection molding compound used for producing the filling piece 15 is the same as the injection molding compound from which the preliminary component 3 is produced. Like in the first exemplary embodiment, bisphenol A or any other polycarbonate suitable for injection molding of optical components may be used as an injection molding compound.

In step S12, the filling piece is then inserted into the receptacle 5 in the preliminary component 3. In the process, it can be adhesively bonded to the preliminary component 3 with the aid of a suitable adhesive after alignment in relation to the interfaces of the injection molded preliminary component. What holds true for the adhesive used to adhesively bond the filling piece 15 to the primary component 3 is that it is advantageous if said adhesive has a refractive index matched to the refractive index of the injection molding material and/or an Abbe number matched to the Abbe number of the injection molding material. However, the more uniform the dimensions of the adhesive gap are, the less importance is placed on the matching of the refractive index and/or the Abbe number.

After inserting the filling piece 15 into the receptacle 5 of the preliminary component 3, the optical component 1 may be post-processed in an optional step S13. In particular, this step may correspond to step S4 from the first exemplary embodiment.

Figure 4:
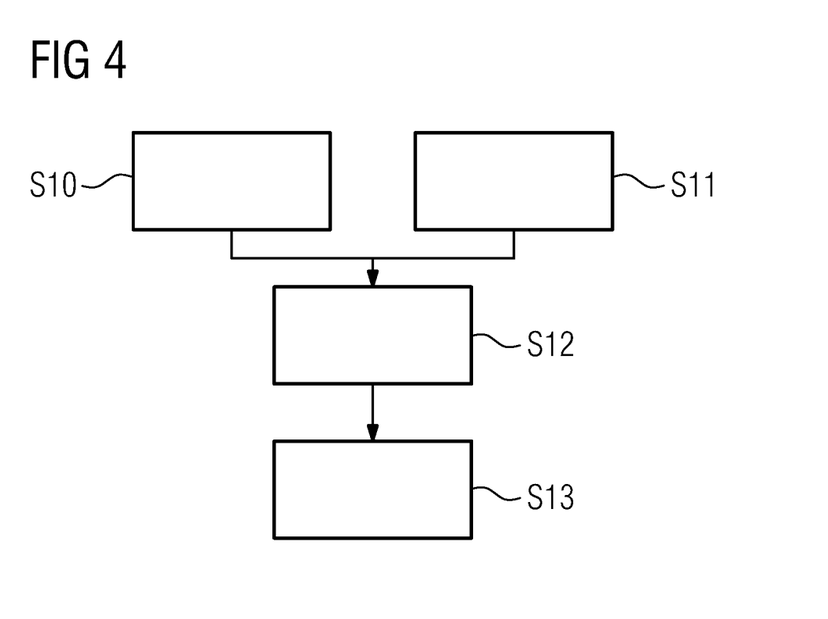
FIG. 4 shows, on the basis of a flowchart, a second exemplary embodiment of the method according to the invention for producing an optical component.

Even though the exemplary embodiment described with reference to FIG. 4 provides for a parallel production of the preliminary component 3 and of the filling piece 15, these may also be produced in succession. It is also possible to produce the preliminary component 3 and the filling piece 15 from different materials, for example different thermoplastics, for instance in order to obtain the desired optical effects. By way of example, cyclic olefin copolymers (COC), polymethyl methacrylate (PMMA), etc., are suitable thermoplastics.

Figure 6:
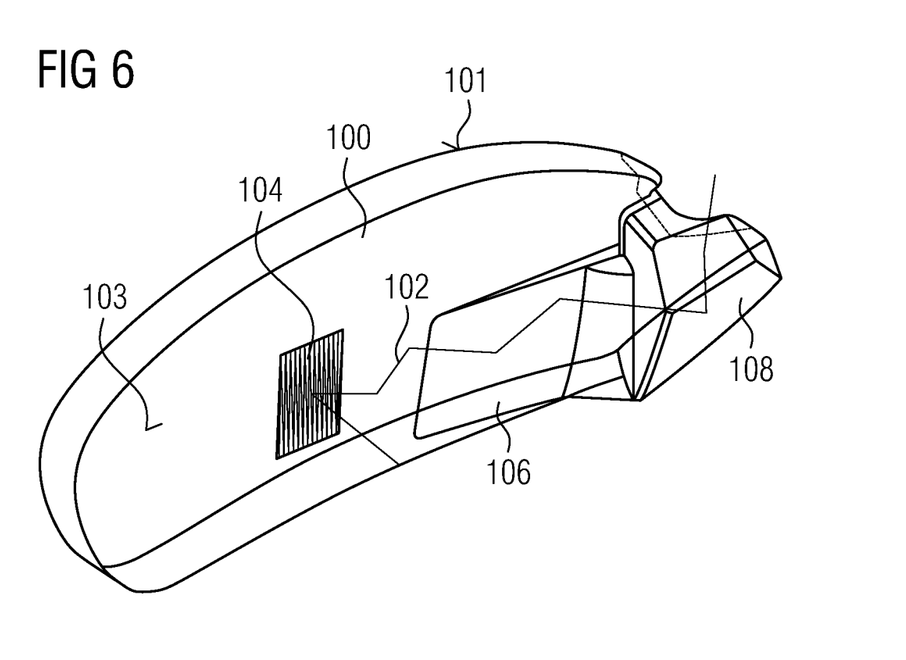
FIG. 6 shows a spectacle lens for smartglasses.

The optical component 1 produced by the method according to the invention may be, in particular, a tube which, for example, serves as input coupling element for coupling in an imaging beam path. As a rule, smartglasses comprise, inter alia, a spectacle lens, through which an imaging beam path, originally emanating from a display apparatus, is guided, typically under multiple reflections at the spectacle lens surfaces, to an output coupling structure, from which it is output coupled from the spectacle lens in the direction of the eye of a user. An example of such a spectacle lens 100 is illustrated in FIG. 6. As shown in FIG. 6, the spectacle lens 100 may have an edge thickening region 106, in which the thickness of the spectacle lens 100 is increased in order to achieve ideal guidance of the imaging beam path to the output coupling structure 104. The imaging beam path 102 is coupled into the spectacle lens 100 with the aid of a tube 108 which serves as an input coupling element. By means of the tube 108, which is occasionally also referred to as a prism, the imaging beam path 102 emanating from the display (not illustrated) is coupled into the spectacle lens 100 at such an angle that it may reach the output coupling structure 104 through multiple reflection at the outer surface 101 and at the inner surface 103 of the spectacle lens 100.

For the purposes of an improved understanding of the invention, the present invention was explained in detail on the basis of exemplary embodiments. However, it is understood that it is possible to deviate from the individual exemplary embodiments and that features of the individual exemplary embodiments can be combined with one another. By way of example, a solidifying viscous filler may also be used instead of a curing viscous filler for the purposes of filling the recess, provided that the solidification process is effectuated with little shrinkage. Therefore, the exemplary embodiments should not be interpreted as restrictive. Instead, the invention should only be restricted by the attached claims. Nor does every possible embodiment variant of the invention need to implement all of the advantages specified in the preceding text, as long as it is comprised by the subject matter defined in the claims.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

LIST OF REFERENCE SIGNS

1 Optical component
3 Preliminary component
5 Recess
7 Final surface of the optical component
9 Large-volume portion
11 Small-volume portion
13 Filler
15 Filling piece
100 Spectacle lens
101 Outer surface
102 Imaging beam path
103 Inner surface
104 Output coupling structure
106 Edge thickening region
108 Tube
S1 Producing the preliminary component
S2 Filling the recess with filler
S3 Curing the filler
S4 Post-processing
S10 Producing the preliminary component
S11 Producing the filling piece
S12 Inserting the filling piece into the recess and adhesive bonding
S13 Post-processing

The invention claimed is:

1. A method for producing an optical component comprising a small-volume portion and a large-volume portion, comprising:
   a) producing a preliminary component via injection molding, wherein the preliminary component already includes the small-volume portion, wherein a region is omitted in the preliminary component in relation to the optical component, and wherein the omitted region is situated in a portion of the preliminary component which corresponds to the large-volume portion in the optical component; and
   b) completing the optical component by mating the preliminary component with the region that was omitted during injection molding after the injection-molded preliminary component has solidified,
   wherein the region in the preliminary component omitted during the injection molding forms a recess in that portion of the preliminary component which corresponds to the large-volume portion in the optical component,
   wherein mating is performed via a filling that is introduced into the recess,
   wherein the filling is either a solidifying or curing viscous filler,
   wherein, after introducing the filling into the recess, solidifying or curing the filling, or inserting a dimensionally stable filling piece into the recess, and
   wherein the small-volume portion is a flat portion and the large-volume portion is thicker than the small-volume portion.

2. The method as claimed in claim 1, wherein the completed optical component includes a region only guiding light in the large-volume portion and the region omitted during the injection molding of the preliminary component is situated where the region only guiding light is present in the completed optical component.

3. The method as claimed in claim 1, wherein the filling is a material that has optical properties corresponding to those of the injection molding material used during injection molding.

4. The method as claimed in claim 3, wherein the refractive index of the material of the filling equals the refractive index of the injection molding material to at least the third decimal place.

5. The method as claimed in claim 3, wherein the Abbe number of the material of the filling Is the Abbe number of the injection molding material to at least the nearest unit.

6. The method as claimed in claim 1, wherein the filling is a material having optical properties which, in view of the optical properties of the preliminary component, are selected such that the filling minimizes optical and geometric aberrations of the preliminary component.

7. The method as claimed in claim 1, wherein the filling piece is produced via an injection molding process.

8. The method as claimed in claim 1, further comprising forming the optical component as a tube for coupling an imaging beam path into a spectacle lens of smartglasses.

9. The method as claimed in claim 1, wherein the preliminary component is made of a polycarbonate and the filler is a reactive adhesive.

10. The method as claimed in claim 1, wherein the small-volume portion and the large-volume portion comprise a same material.

* * * * *